United States Patent
Rouleau

(10) Patent No.: US 9,849,904 B2
(45) Date of Patent: Dec. 26, 2017

(54) RETRACTABLE STEERING COLUMN WITH DUAL ACTUATORS

(71) Applicant: Steering Solutions IP Holding Corporation, Saginaw, MI (US)

(72) Inventor: James E. Rouleau, Burt, MI (US)

(73) Assignee: STEERING SOLUTIONS IP HOLDING CORPORATION, Saginaw, MI (US)

(*) Notice: Subject to any disclaimer, the term of this patent is extended or adjusted under 35 U.S.C. 154(b) by 0 days.

(21) Appl. No.: 14/814,739

(22) Filed: Jul. 31, 2015

(65) Prior Publication Data

US 2017/0029009 A1 Feb. 2, 2017

(51) Int. Cl.
- *B62D 1/185* (2006.01)
- *B62D 1/181* (2006.01)
- *B60D 1/18* (2006.01)

(52) U.S. Cl.
CPC ............. *B62D 1/181* (2013.01); *B60D 1/185* (2013.01)

(58) Field of Classification Search
CPC ......... B62D 1/181; B62D 1/183; B62D 1/185
See application file for complete search history.

(56) References Cited

U.S. PATENT DOCUMENTS

| | | |
|---|---|---|
| 3,643,606 A | 2/1972 | Vise |
| 3,782,492 A | 1/1974 | Hollins |
| 4,315,117 A | 2/1982 | Kokubo et al. |
| 4,337,967 A | 7/1982 | Yoshida et al. |
| 4,453,788 A | 6/1984 | Russell |
| 4,503,300 A | 3/1985 | Lane, Jr. |
| 4,503,504 A | 3/1985 | Suzumura et al. |
| 4,561,323 A | 12/1985 | Stromberg |
| 4,691,587 A * | 9/1987 | Farrand ............... B62D 1/181 280/775 |
| 4,836,566 A | 6/1989 | Birsching |
| 4,921,066 A | 5/1990 | Conley |
| 4,962,570 A | 10/1990 | Hosaka et al. |

(Continued)

FOREIGN PATENT DOCUMENTS

| | | |
|---|---|---|
| CN | 1722030 | 1/2006 |
| CN | 1736786 | 2/2006 |

(Continued)

OTHER PUBLICATIONS

China Patent Application No. 201510204221.5 Second Office Action dated Mar. 10, 2017, 8 pages.

(Continued)

*Primary Examiner* — James English
(74) *Attorney, Agent, or Firm* — Cantor Colburn LLP

(57) ABSTRACT

According to one exemplary embodiment of the present invention a steering column assembly is provided. The steering column assembly includes a steering column shaft. The steering column assembly further includes a retraction actuator to translate an adjustment actuator mounting plate within a retraction range. The steering column further includes an adjustment actuator mounted on the adjustment actuator mounting plate to translate a steering column bracket within an adjustment range. The steering column bracket translates the steering column shaft within a steering column shaft movement range. The steering column shaft movement range is a sum of the retraction range and the adjustment range.

20 Claims, 3 Drawing Sheets

(56) References Cited

U.S. PATENT DOCUMENTS

| | | |
|---|---|---|
| 4,967,618 A | 11/1990 | Matsumoto et al. |
| 4,976,239 A | 12/1990 | Hosaka |
| 5,181,759 A | 1/1993 | Doolittle |
| 5,240,284 A * | 8/1993 | Takada .................. B62D 1/181 280/775 |
| 5,295,712 A | 3/1994 | Omura |
| 5,319,803 A | 6/1994 | Allen |
| 5,488,555 A | 1/1996 | Asgari et al. |
| 5,618,058 A | 4/1997 | Byon |
| 5,662,047 A | 9/1997 | Metcalf |
| 5,668,721 A | 9/1997 | Chandy |
| 5,690,362 A | 11/1997 | Peitsmeier et al. |
| 5,765,116 A | 6/1998 | Wilson-Jones et al. |
| 5,893,580 A | 4/1999 | Hoagland et al. |
| 5,911,789 A | 6/1999 | Keipert et al. |
| 6,070,686 A | 6/2000 | Pollmann |
| 6,170,862 B1 | 1/2001 | Hoagland et al. |
| 6,227,425 B1 | 5/2001 | Ware, Sr. |
| 6,227,571 B1 | 5/2001 | Sheng et al. |
| 6,301,534 B1 | 10/2001 | McDermott, Jr. et al. |
| 6,354,622 B1 | 3/2002 | Ulbrich et al. |
| 6,360,149 B1 | 3/2002 | Kwon et al. |
| 6,373,472 B1 | 4/2002 | Palalau et al. |
| 6,381,526 B1 | 4/2002 | Higashi et al. |
| 6,390,505 B1 | 5/2002 | Wilson |
| 6,578,449 B1 | 6/2003 | Anspaugh et al. |
| 6,612,393 B2 | 9/2003 | Bohner et al. |
| 6,669,233 B2 | 12/2003 | Gabriel |
| 6,819,990 B2 | 11/2004 | Ichinose |
| 7,021,416 B2 | 4/2006 | Kapaan et al. |
| 7,048,305 B2 | 5/2006 | Muller |
| 7,062,365 B1 | 6/2006 | Fei |
| 7,295,904 B2 | 11/2007 | Kanevsky et al. |
| 7,308,964 B2 | 12/2007 | Hara et al. |
| 7,428,944 B2 | 9/2008 | Gerum |
| 7,461,863 B2 | 12/2008 | Muller |
| 7,495,584 B1 | 2/2009 | Sorensen |
| 7,628,244 B2 | 12/2009 | Chino et al. |
| 7,719,431 B2 | 5/2010 | Bolourchi |
| 7,735,405 B2 | 6/2010 | Parks |
| 7,775,584 B2 | 8/2010 | Hughes et al. |
| 7,793,980 B2 | 9/2010 | Fong |
| 7,862,079 B2 | 1/2011 | Fukawatase et al. |
| 7,894,951 B2 | 2/2011 | Norris et al. |
| 7,909,361 B2 | 3/2011 | Oblizajek et al. |
| 8,002,075 B2 | 8/2011 | Markfort |
| 8,027,767 B2 | 9/2011 | Klein et al. |
| 8,055,409 B2 | 11/2011 | Tsuchiya |
| 8,069,745 B2 | 12/2011 | Strieter et al. |
| 8,079,312 B2 | 12/2011 | Long |
| 8,146,945 B2 | 4/2012 | Born et al. |
| 8,170,725 B2 | 5/2012 | Chin et al. |
| 8,260,482 B1 | 9/2012 | Szybalski et al. |
| 8,352,110 B1 | 1/2013 | Szybalski et al. |
| 8,479,605 B2 | 7/2013 | Shavrnoch et al. |
| 8,548,667 B2 | 10/2013 | Kaufmann |
| 8,606,455 B2 | 12/2013 | Boehringer et al. |
| 8,634,980 B1 | 1/2014 | Urmson et al. |
| 8,650,982 B2 | 2/2014 | Matsuno et al. |
| 8,670,891 B2 | 3/2014 | Szybalski et al. |
| 8,695,750 B1 | 4/2014 | Hammond et al. |
| 8,818,608 B2 | 8/2014 | Cullinane et al. |
| 8,825,258 B2 | 9/2014 | Cullinane et al. |
| 8,825,261 B1 | 9/2014 | Szybalski et al. |
| 8,843,268 B2 | 9/2014 | Lathrop et al. |
| 8,874,301 B1 | 10/2014 | Rao et al. |
| 8,880,287 B2 | 11/2014 | Lee et al. |
| 8,881,861 B2 | 11/2014 | Tojo |
| 8,899,623 B2 | 12/2014 | Stadler et al. |
| 8,909,428 B1 | 12/2014 | Lombrozo |
| 8,948,993 B2 | 2/2015 | Schulman et al. |
| 8,950,543 B2 | 2/2015 | Heo et al. |
| 8,994,521 B2 | 3/2015 | Gazit |
| 9,002,563 B2 | 4/2015 | Green et al. |
| 9,031,729 B2 | 5/2015 | Lathrop et al. |
| 9,032,835 B2 | 5/2015 | Davies et al. |
| 9,045,078 B2 | 6/2015 | Tovar et al. |
| 9,073,574 B2 | 7/2015 | Cuddihy et al. |
| 9,092,093 B2 | 7/2015 | Jubner et al. |
| 9,108,584 B2 | 8/2015 | Rao et al. |
| 9,134,729 B1 | 9/2015 | Szybalski et al. |
| 9,150,200 B2 | 10/2015 | Urhahne |
| 9,150,224 B2 | 10/2015 | Yopp |
| 9,164,619 B2 | 10/2015 | Goodlein |
| 9,174,642 B2 | 11/2015 | Wimmer et al. |
| 9,186,994 B2 | 11/2015 | Okuyama et al. |
| 9,193,375 B2 | 11/2015 | Schramm et al. |
| 9,199,553 B2 | 12/2015 | Cuddihy et al. |
| 9,227,531 B2 | 1/2016 | Cuddihy et al. |
| 9,233,638 B2 | 1/2016 | Lisseman et al. |
| 9,235,111 B2 | 1/2016 | Davidsson et al. |
| 9,235,987 B2 | 1/2016 | Green et al. |
| 9,238,409 B2 | 1/2016 | Lathrop |
| 9,248,743 B2 | 2/2016 | Enthaler et al. |
| 9,260,130 B2 | 2/2016 | Mizuno |
| 9,290,174 B1 | 3/2016 | Zagorski |
| 9,290,201 B1 | 3/2016 | Lombrozo |
| 9,298,184 B2 | 3/2016 | Bartels et al. |
| 9,308,857 B2 | 4/2016 | Lisseman et al. |
| 9,308,891 B2 | 4/2016 | Cudak et al. |
| 9,333,983 B2 | 5/2016 | Lathrop |
| 9,352,752 B2 | 5/2016 | Cullinane et al. |
| 9,360,865 B2 | 6/2016 | Yopp |
| 2002/0073899 A1 | 6/2002 | Chen |
| 2003/0046012 A1 | 3/2003 | Yamaguchi |
| 2003/0094330 A1 | 5/2003 | Boloorchi et al. |
| 2003/0188598 A1 | 10/2003 | Cartwright |
| 2003/0227159 A1 | 12/2003 | Muller |
| 2004/0016588 A1 | 1/2004 | Vitale et al. |
| 2004/0046346 A1 | 3/2004 | Eki et al. |
| 2004/0046379 A1 | 3/2004 | Riefe |
| 2004/0099468 A1 | 5/2004 | Chernoff et al. |
| 2004/0129098 A1 | 7/2004 | Gayer et al. |
| 2004/0204808 A1 | 10/2004 | Satoh et al. |
| 2004/0262063 A1 | 12/2004 | Kaufmann et al. |
| 2005/0001445 A1 | 1/2005 | Ercolano |
| 2005/0076815 A1 | 4/2005 | Twyford |
| 2005/0081675 A1 * | 4/2005 | Oshita .................. B62D 1/187 74/493 |
| 2005/0197746 A1 | 9/2005 | Pelchen et al. |
| 2005/0275205 A1 | 12/2005 | Ahnafield |
| 2006/0186658 A1 | 8/2006 | Yasuhara et al. |
| 2006/0224287 A1 | 10/2006 | Izawa et al. |
| 2006/0244251 A1 | 11/2006 | Muller |
| 2007/0021889 A1 | 1/2007 | Tsuchiya |
| 2007/0029771 A1 | 2/2007 | Haglund et al. |
| 2007/0046003 A1 | 3/2007 | Mori et al. |
| 2007/0046013 A1 | 3/2007 | Bito |
| 2007/0099465 A1 | 5/2007 | Ruetz |
| 2007/0241548 A1 | 10/2007 | Fong |
| 2007/0284867 A1 | 12/2007 | Cymbal et al. |
| 2008/0009986 A1 | 1/2008 | Lu et al. |
| 2008/0238068 A1 * | 10/2008 | Kumar .................. B62D 1/183 280/775 |
| 2009/0024278 A1 | 1/2009 | Kondo et al. |
| 2009/0256342 A1 * | 10/2009 | Cymbal ................ B62D 1/192 280/777 |
| 2009/0276111 A1 | 11/2009 | Wang et al. |
| 2009/0292466 A1 | 11/2009 | McCarthy et al. |
| 2010/0152952 A1 | 6/2010 | Lee et al. |
| 2010/0218637 A1 | 9/2010 | Barroso |
| 2010/0228417 A1 | 9/2010 | Lee et al. |
| 2010/0228438 A1 | 9/2010 | Buerkle |
| 2010/0777976 | 9/2010 | Haug |
| 2010/0280713 A1 | 11/2010 | Ulrich Stahlin et al. |
| 2010/0286869 A1 | 11/2010 | Katch et al. |
| 2010/0288567 A1 | 11/2010 | Bonne |
| 2011/0098922 A1 | 4/2011 | Ibrahim |
| 2011/0153160 A1 | 6/2011 | Hesseling et al. |
| 2011/0167940 A1 | 7/2011 | Shavrnoch et al. |
| 2011/0187518 A1 | 8/2011 | Strumolo et al. |
| 2011/0266396 A1 | 11/2011 | Abildgaard et al. |
| 2011/0282550 A1 | 11/2011 | Tada et al. |
| 2012/0136540 A1 | 5/2012 | Miller |

(56) References Cited

U.S. PATENT DOCUMENTS

| | | |
|---|---|---|
| 2012/0205183 A1 | 8/2012 | Rombold |
| 2012/0209473 A1 | 8/2012 | Birsching et al. |
| 2012/0215377 A1 | 8/2012 | Takemura et al. |
| 2012/0287000 A1 | 11/2012 | Wu |
| 2013/0002416 A1 | 1/2013 | Gazit |
| 2013/0087006 A1 | 4/2013 | Ohtsubo et al. |
| 2013/0158771 A1 | 6/2013 | Kaufmann |
| 2013/0199866 A1 | 8/2013 | Yamamoto et al. |
| 2013/0218396 A1 | 8/2013 | Moshchuk et al. |
| 2013/0233117 A1* | 9/2013 | Read ............... B62D 1/181 74/493 |
| 2013/0325202 A1 | 12/2013 | Howard et al. |
| 2014/0028008 A1 | 1/2014 | Stadler et al. |
| 2014/0046542 A1 | 2/2014 | Kauffman et al. |
| 2014/0046547 A1 | 2/2014 | Kaufmann et al. |
| 2014/0111324 A1 | 4/2014 | Lisseman et al. |
| 2014/0277896 A1 | 9/2014 | Lathrop et al. |
| 2014/0300479 A1 | 10/2014 | Wolter et al. |
| 2014/0309816 A1 | 10/2014 | Stefan et al. |
| 2015/0002404 A1 | 1/2015 | Hooton |
| 2015/0014086 A1 | 1/2015 | Eisenbarth |
| 2015/0032322 A1 | 1/2015 | Wimmer |
| 2015/0051780 A1 | 2/2015 | Hahne |
| 2015/0060185 A1 | 3/2015 | Feguri |
| 2015/0120142 A1 | 4/2015 | Park et al. |
| 2015/0137492 A1 | 5/2015 | Rao et al. |
| 2015/0203145 A1 | 7/2015 | Sugiura et al. |
| 2015/0210273 A1 | 7/2015 | Kaufmann et al. |
| 2015/0246673 A1 | 9/2015 | Tseng et al. |
| 2015/0251666 A1 | 9/2015 | Attard et al. |
| 2015/0283926 A1 | 10/2015 | Hamdoon et al. |
| 2015/0283998 A1 | 10/2015 | Lind et al. |
| 2015/0324111 A1 | 11/2015 | Jubner et al. |
| 2016/0009332 A1 | 1/2016 | Sirbu |
| 2016/0075371 A1 | 3/2016 | Varunkikar et al. |
| 2016/0082867 A1 | 3/2016 | Sugioka et al. |
| 2016/0185387 A1 | 6/2016 | Kuoch |
| 2016/0200246 A1 | 7/2016 | Lisseman et al. |
| 2016/0200343 A1 | 7/2016 | Lisseman et al. |
| 2016/0200344 A1 | 7/2016 | Sugioka et al. |
| 2016/0207538 A1 | 7/2016 | Urano et al. |
| 2016/0209841 A1 | 7/2016 | Yamaoka |
| 2016/0229450 A1 | 8/2016 | Basting et al. |
| 2016/0231743 A1 | 8/2016 | Bendewald et al. |
| 2016/0244070 A1 | 8/2016 | Bendewald et al. |
| 2016/0318540 A1 | 11/2016 | King |
| 2016/0318542 A1 | 11/2016 | Pattok et al. |
| 2016/0325662 A1 | 11/2016 | Nash |
| 2016/0347347 A1 | 12/2016 | Lubischer |
| 2016/0347348 A1 | 12/2016 | Lubischer |
| 2016/0362084 A1 | 12/2016 | Martin et al. |
| 2016/0362117 A1 | 12/2016 | Kaufmann et al. |
| 2016/0362126 A1 | 12/2016 | Lubischer |
| 2016/0368522 A1 | 12/2016 | Lubischer |
| 2016/0375770 A1 | 12/2016 | Ryne et al. |
| 2016/0375860 A1 | 12/2016 | Lubischer |
| 2016/0375923 A1 | 12/2016 | Schulz |
| 2016/0375924 A1 | 12/2016 | Bodtker |
| 2016/0375925 A1 | 12/2016 | Lubischer et al. |
| 2016/0375926 A1 | 12/2016 | Lubischer et al. |
| 2016/0375927 A1 | 12/2016 | Schulz |
| 2016/0375928 A1 | 12/2016 | Magnus |
| 2016/0375929 A1 | 12/2016 | Rouleau |
| 2016/0375931 A1 | 12/2016 | Lubischer |
| 2017/0029018 A1 | 2/2017 | Lubischer |
| 2017/0113589 A1 | 4/2017 | Riefe |
| 2017/0113712 A1 | 4/2017 | Watz |

FOREIGN PATENT DOCUMENTS

| | | |
|---|---|---|
| CN | 101037117 | 9/2007 |
| CN | 101041355 | 9/2007 |
| CN | 101596903 | 12/2009 |
| CN | 102452391 | 5/2012 |
| CN | 103419840 | 12/2013 |
| DE | 1020081057313 A1 | 0/2008 |
| DE | 2025003 A | 12/1971 |
| DE | 19523214 A1 | 1/1997 |
| DE | 19923012 | 11/2000 |
| DE | 10212782 A1 | 10/2003 |
| DE | 102005032528 | 1/2007 |
| DE | 102005056438 A1 | 6/2007 |
| DE | 102006025254 | 12/2007 |
| DE | 102010025197 A1 | 12/2011 |
| EP | 1559630 A2 | 8/2005 |
| EP | 1783719 | 5/2007 |
| EP | 1932745 A2 | 6/2008 |
| EP | 2384946 A2 | 11/2011 |
| EP | 2426030 A1 | 3/2012 |
| EP | 2489577 A2 | 8/2012 |
| EP | 2604487 A1 | 6/2013 |
| EP | 1606149 B1 | 5/2014 |
| FR | 2862595 | 5/2005 |
| FR | 3016327 A1 | 7/2015 |
| JP | H05162652 | 6/1993 |
| KR | 20100063433 A | 6/2010 |
| WO | 2006099483 A1 | 9/2006 |
| WO | 2010082394 A1 | 7/2010 |
| WO | 2010116518 | 10/2010 |

OTHER PUBLICATIONS

CN Patent Application No. 201210599006.6 First Office Action dated Jan. 27, 2015, 9 pages.
CN Patent Application No. 201210599006.6 Second Office Action dated Aug. 5, 2015, 5 pages.
CN Patent Application No. 201310178012.9 First Office Action dated Apr. 13, 2015, 13 pages.
CN Patent Application No. 201310178012.9 Second Office Action dated Dec. 28, 2015, 11 pages.
CN Patent Application No. 201410089167 First Office Action and Search Report dated Feb. 3, 2016, 9 pages.
EP Application No. 14156903.8 Extended European Search Report, dated Jan. 27, 2015, 10 pages.
EP Application No. 14156903.8 Office Action dated Nov. 16, 2015, 4 pages.
EP Application No. 14156903.8 Office Action dated May 31, 2016, 5 pages.
EP Application No. 14156903.8 Partial European Search Report dated Sep. 23, 2014, 6 pages.
EP Application No. 15152834.6 Extended European Search Report dated Oct. 8, 2015, 7 pages.
European Application No. 12196665.9 Extended European Search Report dated Mar. 6, 2013, 7 pages.
European Search Report for European Application No. 13159950.8; dated Jun. 6, 2013; 7 pages.
European Search Report for related European Application No. 15152834.6, dated Oct. 8, 2015; 7 pages.
Gillespie, Thomas D.; "Fundamentals of Vehicle Dynamics"; Society of Automotive Engineers, Inc.; published 1992; 294 pages.
Kichun, et al.; "Development of Autonomous Car—Part II: A Case Study on the Implementation of an Autonomous Driving System Based on Distributed Architecture"; IEEE Transactions on Industrial Electronics, vol. 62, No. 8, Aug. 2015; 14 pages.
Office Action dated Aug. 29, 2016.
Partial European Search Report for related European Patent Application No. 14156903.8, dated Sep. 23, 2014, 6 pages.
Van Der Jagt, Pim; "Prediction of steering efforts during stationary or slow rolling parking maneuvers"; Jul. 2013, 20 pages.
Varunjikar, Tejas; Design of Horizontal Curves With DownGrades Using Low-Order Vehicle Dynamics Models; A Theisis by T. Varunkikar; 2011; 141 pages.

* cited by examiner

RETRACTABLE STEERING COLUMN WITH DUAL ACTUATORS

FIELD OF THE INVENTION

The following description relates to steering column assemblies and, more specifically, to a retractable steering column assembly.

BACKGROUND

When some vehicles are fitted with autonomous driving assist systems, it may become possible to retract and stow the steering column and wheel away from the driver to provide space for non-driving related activities such as working, reading, and game playing. However, if the autonomous driver assistance system relinquishes control, a typical return of the steering wheel to a driving position may be longer than needed for the driver to regain safe control.

Accordingly, it is desirable to provide a steering column assembly that enables the driver to rapidly return the wheel from a retracted position.

SUMMARY OF THE INVENTION

According to one exemplary embodiment of the present invention a steering column assembly is provided. The steering column assembly includes a steering column shaft. The steering column assembly further includes a retraction actuator to translate an adjustment actuator mounting plate within a retraction range. The steering column further includes an adjustment actuator mounted on the adjustment actuator mounting plate to translate a steering column bracket within an adjustment range. The steering column bracket translates the steering column shaft within a steering column shaft movement range. The steering column shaft movement range is a sum of the retraction range and the adjustment range.

In another exemplary embodiment of the present invention a method to deploy and retract a steering column shaft is provided. The method includes translating an adjustment actuator within a retraction range via a retraction actuator. The method further includes translating a steering column bracket within an adjustment range via the adjustment actuator. The method further includes translating a steering column shaft within a steering column shaft movement range via the steering column bracket. The steering column shaft movement range is a sum of the retraction range and the adjustment range.

In yet another exemplary embodiment of the present invention, a vehicle is provided. The vehicle includes a steering column assembly. The steering column assembly includes a steering column shaft, a column jacket, and a steering wheel. The steering wheel is coupled to the steering column shaft. The steering column assembly further includes a retraction actuator to translate an adjustment actuator mounting plate within a retraction range. The steering column further includes an adjustment actuator mounted on the adjustment actuator mounting plate to translate a steering column bracket within an adjustment range. The steering column bracket translates the steering column shaft within a steering column shaft movement range. The steering column shaft movement range is a sum of the retraction range and the adjustment range.

These and other advantages and features will become more apparent from the following description taken in conjunction with the drawings.

BRIEF DESCRIPTION OF THE DRAWINGS

The subject matter which is regarded as the invention is particularly pointed out and distinctly claimed in the claims at the conclusion of the specification. The foregoing and other features, and advantages of the invention are apparent from the following detailed description taken in conjunction with the accompanying drawings in which:

DETAILED DESCRIPTION

Figure 1:
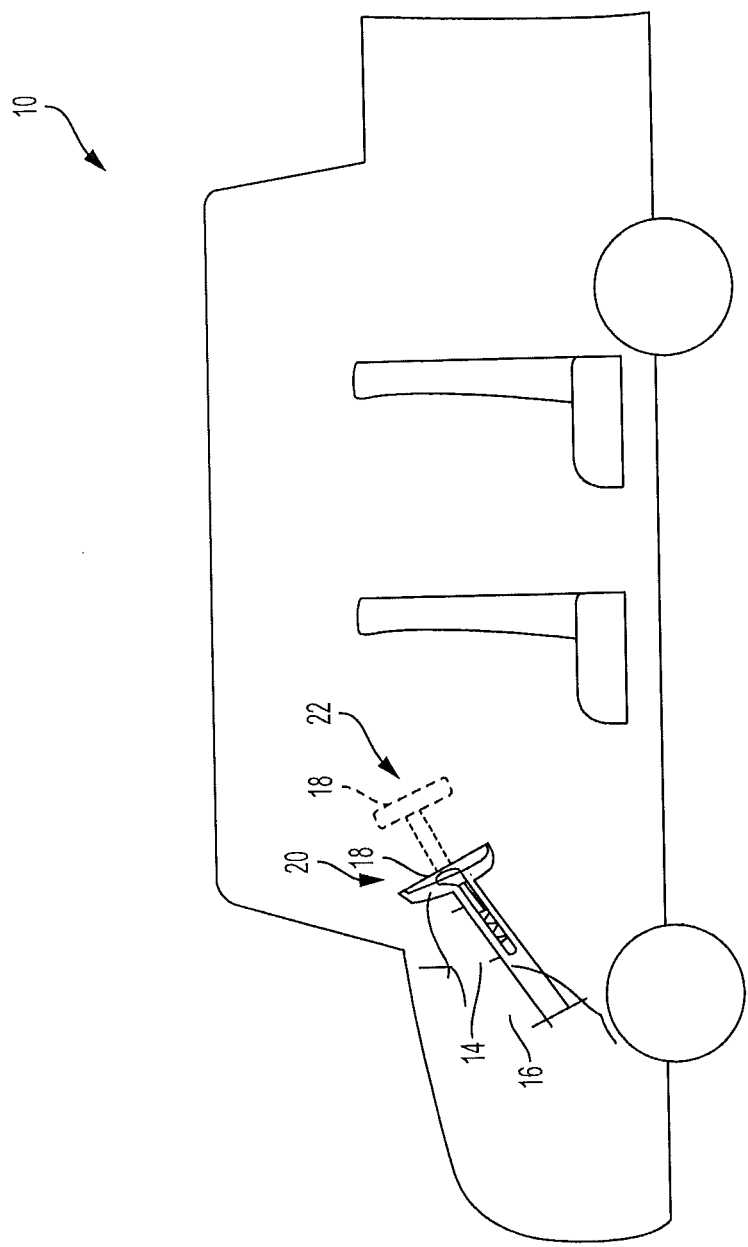
FIG. 1 is a schematic view of a vehicle and steering column assembly according to one embodiment of the disclosure.

Referring now to the Figures, where the invention will be described with reference to specific embodiments, without limiting same, FIG. 1 illustrates an exemplary vehicle 10, such as an autonomous driving assisted steering ("ADAS") equipped vehicle, generally having a retractable steering column assembly 14. The steering column assembly 14 generally includes a steering column shaft 16 and a steering input device, such as steering wheel 18, coupled thereto.

In the illustrated embodiment, steering column assembly 14 is movable between a retracted position 20, and a deployed or driving position 22. In the retracted position 20, portions of assembly 14 such as steering wheel 18 are disposed away from the driver, which provides increased space for the driver. The displacement of the steering column shaft 16 and wheel 18 in retracted position 20 creates additional cabin space for the driver's comfort and convenience to perform non-driving activities including, but not limited to, reading, working, entertaining, eating, texting, etc. In the driving position 22, steering wheel 18 may be used by a driver to steer the vehicle. In certain embodiments, the position of the steering column shaft 16 and the steering wheel 18 can be adjusted in the driving position 22 to provide a desired position for the driver. The adjustable driving position may be stored or otherwise recorded when returning from a retracted position 20 to a driving position 22.

In certain embodiments, the steering wheel 18 can be automatically retracted in a retracted position 20 in response to the initiation of an autonomous driving event. Similarly, the steering wheel 18 can be extended to the driving position 22 to provide control to the driver at the termination of an autonomous driving event, or when an autonomous driving system requires the input of the driver. Accordingly, it may be desired to extend the steering wheel 22 to the driving position 22 rapidly to provide control to the driver as required.

Figure 2:
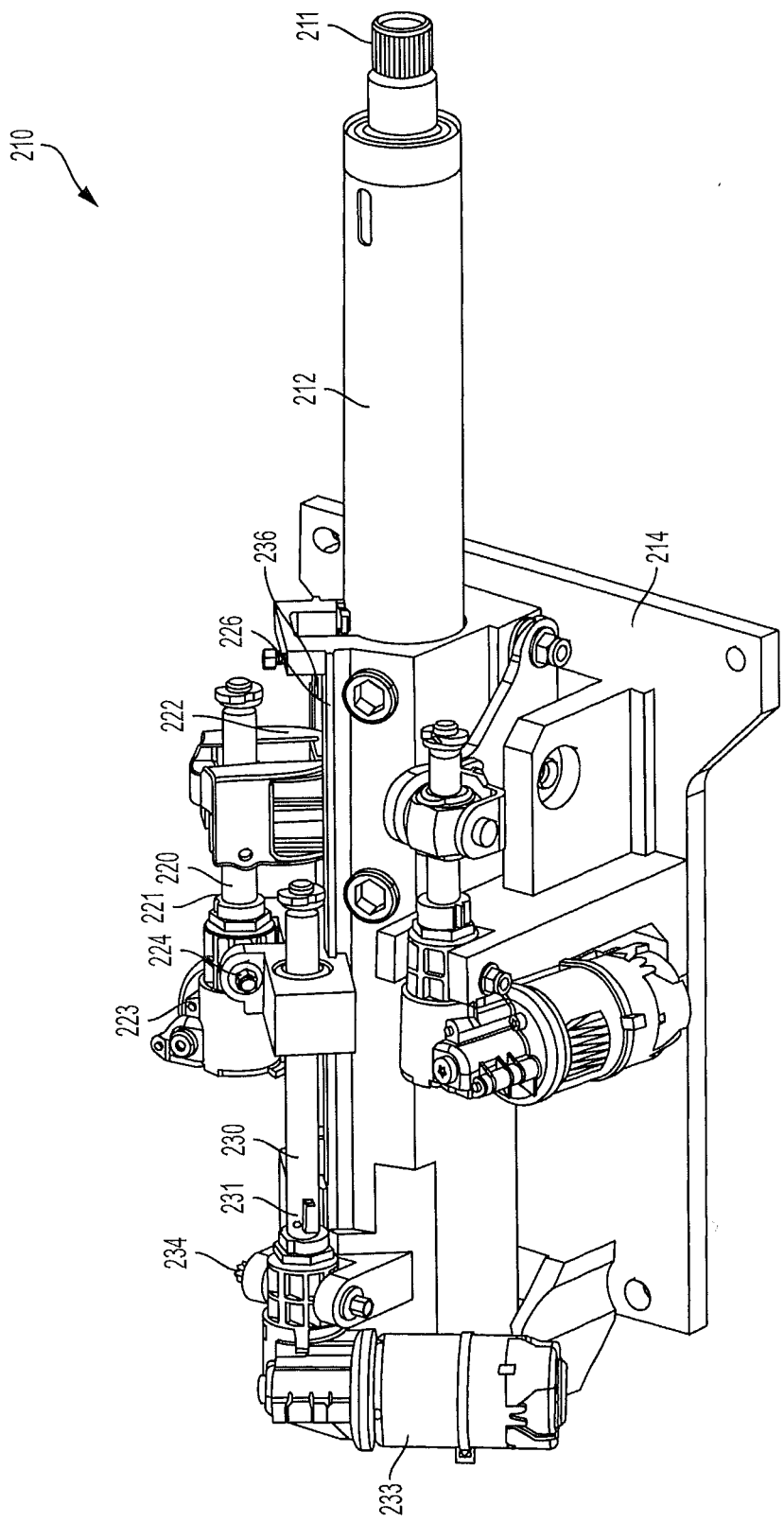
FIG. 2 is a perspective view of a steering column assembly according to one embodiment of the disclosure.
Figure 3:
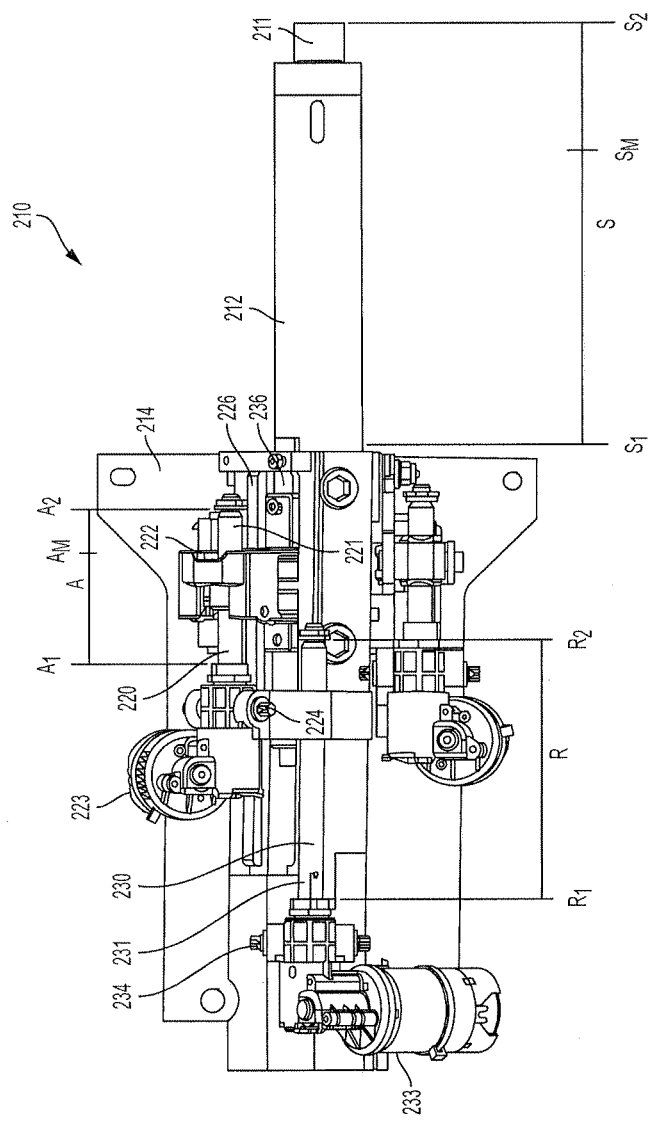
FIG. 3 is a plan view of the steering column of FIG. 2.

Referring to FIGS. 2 and 3, an illustrated embodiment of the steering column assembly 210 is shown. In the illustrated embodiment, the steering column assembly 210 includes a steering column shaft 211, a column jacket 212, an assembly bracket 214, an adjustment actuator 220, and a retraction actuator 230. The steering column assembly 210 can extend and retract the steering column shaft 211 rapidly to provide the driver access to the steering wheel as required.

In the illustrated embodiment, the column shaft 211 is attached to a steering wheel as shown in FIG. 1. The column shaft 211 includes a column jacket 212 disposed around the column shaft 211. In the illustrated embodiment, the column shaft 211 can be telescoped or translated via the adjustment actuator 220 and the retraction actuator 230. However, the column shaft 211 may also be movable in a rake or tilt direction. As shown in FIG. 3, the column shaft 211 has a steering column shaft movement range S to allow the column shaft 211 to translate or telescope. Advantageously, the steering column shaft movement range S allows for a steering wheel to be retracted when not in use and extended when required. Further, the steering column shaft movement range S allows for driver adjustability for a desired operating position.

In the illustrated embodiment, the adjustment actuator 220 includes a lead screw 221, a steering column bracket 222, a motor 223, and an adjustment actuator mounting plate 224. The adjustment actuator 220 allows for adjustments to the steering column shaft 211 in a deployed position and can be utilized to provide at least some of the retraction of the steering column shaft 211. In the illustrated embodiment, the adjustment actuator 220 is mounted to the retraction actuator 230 via the adjustment actuator mounting plate 224 to allow the retraction actuator 230 to translate the adjustment actuator 220, facilitating in series operation of the retraction actuator 230 and the adjustment actuator 220.

In the illustrated embodiment, the adjustment actuator 220 is any suitable actuator to translate the steering column bracket 222. In certain embodiments, the adjustment actuator 220 is a screw type actuator with a lead screw 221. The lead screw 221 may be rotated via a motor 223. In certain embodiments, the steering column bracket 222 is threadedly engaged to the lead screw 221 and translates along the lead screw 221 as the lead screw 221 rotates in either direction. A steering column bracket rail 226 may guide the steering column bracket 222.

In the illustrated embodiment, the steering column bracket 222 is coupled to the steering column shaft 211 directly or via the column jacket 212. The adjustment actuator 220 is configured to move the steering column bracket 222 along an adjustment range A. In certain embodiments, the adjustment actuator 220 translates the steering column bracket 222 at a rate of approximately 10-12 millimeters per second. The adjustment range A may extend between a minimum adjustment position $A_1$ and a maximum adjustment position $A_2$. In certain embodiments, the adjustment range A can be from 40 to 60 millimeters.

Accordingly, the position of the steering column bracket 222 can be translated along the adjustment range A to provide a range of adjustment to the column shaft 211 and the attached steering wheel for driver comfort. In particular, the adjustment range A can provide for driver comfort when the steering column shaft 211 is in a generally deployed position. A desired position can be stored as memory position $A_m$.

Additionally, the adjustment actuator 220 can retract the steering column bracket 222 toward the minimum adjustment position A1 to provide the driver additional room when the column shaft 211 is in the retracted position. Advantageously, the adjustment actuator 220 can retract to the minimum adjustment position $A_1$ while the retraction actuator 230 is concurrently retracting to increase the overall speed of retraction of the column shaft 211. In certain embodiments, the adjustment actuator 220 can utilize the user memory position $A_m$ to maintain the adjustment position of the column shaft 211 after the shaft is retracted and then later redeployed.

In the illustrated embodiment, the retraction actuator 230 includes a lead screw 231, a motor 233, a retraction actuator mounting plate 234 and the adjustment actuator mounting plate 224. The retraction actuator 230 generally allows the steering column shaft 211 to be translated from an at least partially retracted position to a deployed position. In the illustrated embodiment, the retraction actuator 230 can translate the adjustment actuator 220, facilitating in series operation of the retraction actuator 230 and the adjustment actuator 220.

In the illustrated embodiment, the retraction actuator 230 is any suitable actuator to translate the adjustment actuator mounting plate 224. In the illustrated embodiment, the retraction actuator 230 is coupled to the assembly bracket 214 via the retraction actuator mounting plate 234. In certain embodiments, the retraction actuator 230 is a screw type actuator with a lead screw 231. The lead screw 231 may be rotated via a motor 233. In certain embodiments, the adjustment actuator mounting plate 224 is threadedly engaged to the lead screw 231 and translates along the lead screw 231 as the lead screw 231 rotates in either direction. The mounting plate rail 236 may guide the adjustment actuator mounting plate 224.

In the exemplary embodiment, the retraction actuator 230 is configured to move the adjustment actuator mounting plate 224 and the adjustment actuator 220 along the retraction range R. In certain embodiments, the retraction actuator 230 translates the adjustment actuator mounting plate 224 at a rate of approximately 10-12 millimeters per second. The retraction range R may extend between a retracted position $R_1$ and a deployed position $R_2$. In certain embodiments, the retraction range R can be from 90 to 110 millimeters. Further, the position of the adjustable actuator mounting plate 224 can adjust the position of the steering column shaft 211 by translating the steering column bracket 222 of the adjustment actuator 220.

Advantageously, the retraction actuator 230 can work in series with the adjustment actuator 220 to provide a rapid translation of the steering column shaft 211. Further, the in series arrangement of the adjustment actuator 220 and the retraction actuator 230 can combine the operating ranges R and A to provide a total translation range S. The steering column shaft movement range S may extend between a fully retracted position $S_1$ and a fully extended position $S_2$. In the illustrated embodiment, the steering column shaft movement range S may be between 130 and 170 millimeters.

Accordingly, since the adjustment actuator 220 and the retraction actuator 230 operate in series, the concurrent operation of the adjustment actuator 220 and the retraction actuation 230 allows double the translation rate while providing a wide range of translation within the steering column shaft movement range S. In the illustrated embodiment, the steering column shaft 211 can translate within the steering column shaft movement range S at a rate of approximately 20-24 millimeters per second.

During operation, the steering column shaft 211 can be retracted to place the steering wheel to a position $S_1$. In certain embodiments, the steering column shaft 211 can be retracted during autonomous vehicle operation or any other suitable event. To facilitate retraction, the retraction actuator 230 can retract to a retracted position $R_1$. Further, the adjustment actuator 220 can concurrently retract to a minimum extension position $A_1$. Advantageously, since the adjustment actuator 220 and the retraction actuator 230 are operating in series the steering column shaft 211 can move more rapidly than if actuated by a single actuator.

During extension of the steering column shaft 211, the steering column shaft 211 can extend from the fully retracted position $S_1$ to a desired position. In certain embodiments, the steering column shaft 211 can be extended at the termination of an autonomous vehicle operation or otherwise when driver input is required. In certain embodiments, the steering column shaft 211 is extended to toward the fully extended position $S_2$. To facilitate extension, the retraction actuator 230 extends from the retracted position $R_1$ to the deployed position $R_2$. Concurrently, the adjustment actuator 220 extends from the minimum extension $A_1$ towards a maximum extension $A_2$. Advantageously, the use of both the adjustment actuator 220 and the retraction actuator 230 allows the steering column shaft 211 can extend rapidly.

In certain embodiments, during extension, the steering column shaft 211 can be extended to a preset memory position $S_m$. In certain embodiments, the memory position $A_m$ of the adjustment actuator 220 corresponds to the steering column shaft 211 memory position $S_m$, when the retraction actuator 230 is fully deployed in position $R_2$.

In certain embodiments, during extension of the steering column shaft 211, the adjustment actuator 220 may extend to the memory position $A_m$ before the retraction actuator 230 has fully deployed in position $R_2$. In order to expedite the extension of the steering column shaft 211 to the memory position $S_m$, the adjustment actuator 220 can continue to extend the column shaft bracket 222 beyond the $A_m$ position, towards the maximum extension $A_2$ of the adjustment actuator 220, to allow both actuators 220 and 230 to continue to extend the steering column shaft 211 in series. After the steering column shaft 211 has reached the desired memory position $S_m$, the retraction actuator 230 can continue to extend to the deployed position $R_2$, while the adjustable actuator 220 may reverse translation direction to reach the position $A_m$, allowing the steering column shaft 211 to maintain the memory position $S_m$.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description.

Having thus described the invention, it is claimed:

1. A steering column assembly comprising:
    a steering column shaft;
    a retraction actuator to translate an adjustment actuator mounting plate within a retraction range;
    an adjustment actuator mounted on the adjustment actuator mounting plate to translate a steering column bracket within an adjustment range, the steering column bracket configured to translate the steering column shaft within a steering column shaft movement range, the steering column shaft movement range being a sum of the retraction range and the adjustment range.

2. The steering column assembly of claim 1, wherein the retraction actuator translates the adjustment actuator mounting plate within the retraction range and the adjustment actuator translates the steering column bracket within the adjustment range to correspond to a memory position within the steering column shaft movement range.

3. The steering column assembly of claim 2, wherein the retraction actuator translates the adjustment actuator mounting plate to a deployed position within the retraction range.

4. The steering column assembly of claim 2, wherein the retraction actuator translates the adjustment actuator mounting plate to a non-deployed position within the retraction range.

5. The steering column assembly of claim 1, wherein the adjustment actuator mounting plate translates on a mounting plate rail.

6. The steering column assembly of claim 1, wherein the retraction actuator translates the adjustment actuator mounting plate and the adjustment actuator translates the steering column bracket concurrently.

7. The steering column assembly of claim 1, wherein the retraction actuator and the adjustment actuator are activated in response to an autonomous driving event.

8. A method to deploy and retract a steering column shaft, the method comprising:
    translating an adjustment actuator within a retraction range via a retraction actuator;
    translating a steering column bracket within an adjustment range via the adjustment actuator; and
    translating a steering column shaft within a steering column shaft movement range via the steering column bracket, the steering column shaft movement range being a sum of the retraction range and the adjustment range.

9. The method of claim 8, further comprising translating an adjustment actuator mounting plate within the retraction range via the retraction actuator and translating the steering column bracket within the adjustment range via the adjustment actuator to correspond to a memory position within the steering column shaft movement range.

10. The method of claim 9, further comprising translating the adjustment actuator mounting plate to a deployed position within the retraction range via the retraction actuator.

11. The method of claim 9, further comprising translating the adjustment actuator mounting plate to a non-deployed position within the retraction range via the retraction actuator.

12. The method of claim 9, further comprising translating the adjustment actuator mounting plate on a mounting plate rail.

13. The method of claim 9, further comprising concurrently translating the adjustment actuator mounting plate via the retraction actuator and translating the steering column bracket via the adjustment actuator.

14. The method of claim 8, further comprising activating the retraction actuator and the adjustment actuator in response to an autonomous driving event.

15. A vehicle comprising:
    a steering column assembly comprising:
        a steering column shaft;
        a column jacket;
        a steering wheel coupled to the steering column shaft;
        a retraction actuator to translate an adjustment actuator mounting plate within a retraction range; and
        an adjustment actuator mounted on the adjustment actuator mounting plate to translate a steering column bracket within an adjustment range, the steering column bracket configured to translate the steering column shaft within a steering column shaft movement range, the steering column shaft movement range being a sum of the retraction range and the adjustment range.

16. The vehicle of claim 15, wherein the retraction actuator translates the adjustment actuator mounting plate within the retraction range and the adjustment actuator translates the steering column bracket within the adjustment range to correspond to a memory position within the steering column shaft movement range.

17. The vehicle of claim 16, wherein the retraction actuator translates the adjustment actuator mounting plate to a deployed position within the retraction range.

18. The vehicle of claim 16, wherein the retraction actuator translates the adjustment actuator mounting plate to a non-deployed position within the retraction range.

19. The vehicle of claim 15, wherein the adjustment actuator mounting plate translates on a mounting plate rail.

20. The vehicle of claim 15, wherein the retraction actuator translates the adjustment actuator mounting plate and the adjustment actuator translates the steering column bracket concurrently.

* * * * *